L. WINTER.
AUTOMOBILE RADIATOR HEATER.
APPLICATION FILED AUG. 30, 1915.
1,169,312.
Patented Jan. 25, 1916.
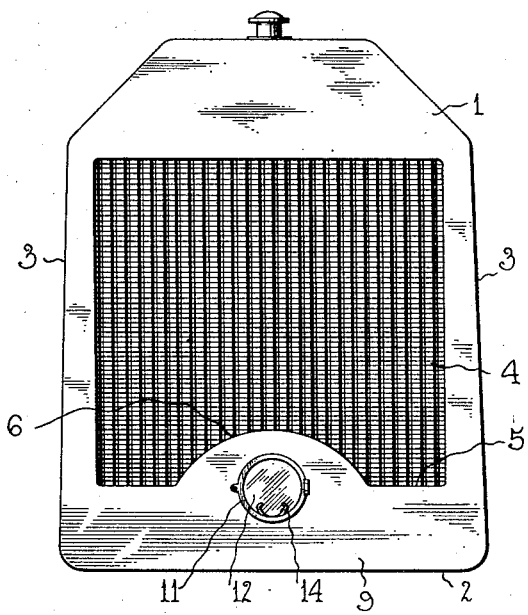
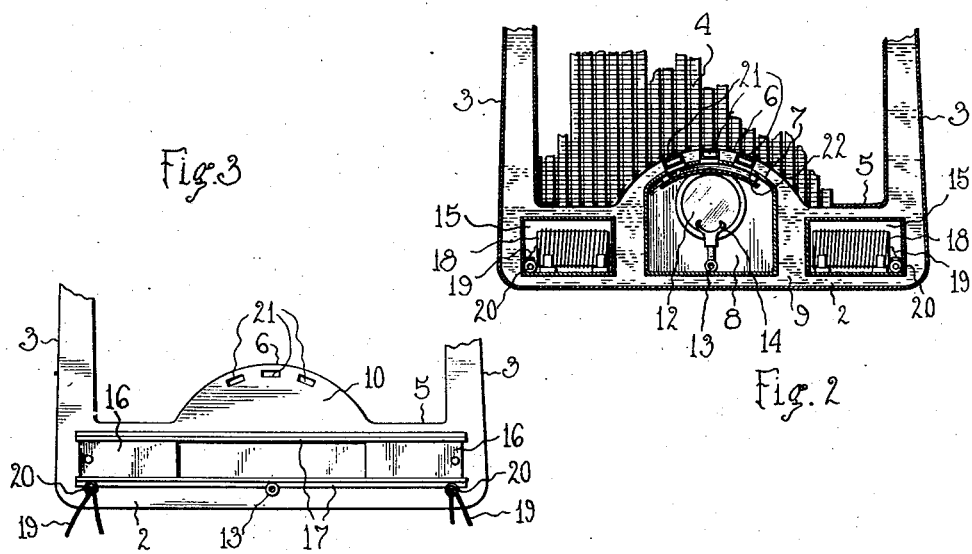
Witnesses
Arthur F. Draper
Karl H. Butler
Inventor
Louis Winter
By 
Attorneys

UNITED STATES PATENT OFFICE.

LOUIS WINTER, OF DETROIT, MICHIGAN, ASSIGNOR OF ONE-HALF TO J. M. SCHAEFFER, OF DETROIT, MICHIGAN.

AUTOMOBILE-RADIATOR HEATER.

1,169,312.   Specification of Letters Patent.   Patented Jan. 25, 1916.

Application filed August 30, 1915. Serial No. 47,929.

*To all whom it may concern:*

Be it known that I, LOUIS WINTER, a citizen of the United States of America, residing at Detroit, in the county of Wayne and State of Michigan, have invented certain new and useful Improvements in Automobile-Radiator Heaters, of which the following is a specification, reference being had therein to the accompanying drawings.

This invention relates to heaters for automobile radiators, and the primary object of my invention is to provide the base of a radiator with heating devices, one of which services functionally as a headlight and coöperates with the other devices in heating water in the radiator or circulated therethrough.

Another object of this invention is to provide heating devices for an automobile radiator which may be operated in connection with the ordinary gas lighting and electric ignition system of an automobile, particularly in the winter time, to prevent the water in the radiator or the jacket of an engine from freezing and bursting the radiator, the engine jacket or causing leakage of either.

A further object of my invention is to furnish the base of a radiator with heating compartments which are constructed with a view of reducing the cost of automobile maintenance during the winter, and at the same time retain those features by which practicability is insured.

The above and other objects are attained by a mechanical construction that will be hereinafter described and then claimed, reference will now be had to the drawing, wherein—

Figure 1 is a front elevation of a radiator in accordance with my invention; Fig. 2 is a vertical sectional view of a portion of the same, and Fig. 3 is a rear elevation of a portion of the radiator.

The radiator shown, as far as the cooling of water is concerned, is of the ordinary and well known type embodying an upper portion or tank 1, a bottom portion or tank 2, hollow legs 3, and a honeycomb construction 4. It is in connection with the lower portion or tank 2 of the radiator that my invention resides and consists in arching the top wall 5 of the bottom tank, as at 6 to coöperate with the arched roof 7 of a compartment 8 centrally of the tank 2. The compartment 8 is formed by a shell connecting the front and rear walls 9 and 10 respectively of a tank 2, and water can freely circulate around said compartment and contact with the walls thereof.

The front wall 9 of the tank 2 has an opening normally closed by a hinged frame 11 provided with a bull's eye or lens 12, said frame and the opening of the front wall permitting of easy access being had to the interior carrier of the compartment 8. Extending into the compartment is a gas supply pipe 13 provided with a burner 14 and gas can be ignited at said burner to provide a headlight and also heat the walls of the compartment. To provide for proper combustion within the compartment 8, the arched roof 7 thereof is provided with a plurality of air conduits 21 extending rearwardly to the wall 10, as shown in Fig. 3 and in consequence of this arrangement, hot air will be directed toward the engine of an automobile. To prevent the flames of the burner 14 from injuring the arched roof 7, a baffle 22 is suspended from the roof, said baffle being made of cast iron or of material that will not be injured by the flames.

Other compartments 15 are disposed transversely of the tank 2 and these compartments are formed by rectangular shells connecting the front and rear walls of the tank. The rear wall 10 of the tank, at the compartments 15, has openings adapted to be normally closed by slide doors 16 disposed between longitudinal parallel guides or rails 17, carried by the rear wall 10 of the tank. These slide doors at the openings of the rear wall permit of easy access being had to the compartments 15 and in said compartments are detachably mounted electric heating elements 18. These elements are of a conventional form composed of cores of insulation upon which there are wound resistance coils, said coils having leading in wires 19 extending through insulators 20 mounted in the rear wall 10 of the tank 2. A suitable source of electrical energy, for instance that used by the electric ignition system of an automobile, can be utilized for operating the electric heating element, and with the walls of the compartments 15 heated, said compartments will coöperate with the compartment 8 in heating water that circulates around the shells of said compartments.

The electric heating elements are sufficient to prevent water from freezing in the radiator independent of the central heating compartment, and this central heating compartment can be utilized at night, in conjunction with the heating compartments 15 simply as a headlight.

The upper wall 5 of the tank 2 and the roof of the compartment 8 are arched to increase the area of the compartment 8 and afford a greater circulation for water, which contacting with the walls of the compartment 8 is heated. The size of the compartment 8 also permits of a large bull's eye being used as a headlight and this headlight, for ordinary traveling purposes, obviates the necessity of using side lanterns on an automobile.

One embodiment of my invention has been illustrated and it is to be understood that the structural elements are susceptible to such variations and modifications as fall within the scope of the appended claims.

What I claim is:—

1. A radiator having a lower tank portion provided with three hating compartments, heating devices in the compartments, means at the rear side of said radiator whereby easy access can be had to two of said compartments, and means at the front side of said radiator whereby easy access can be had to the other of said compartments.

2. A radiator having a lower tank portion with the top wall thereof arched, shells transversely of the lower tank portion of said radiator coöperating with the front and rear walls thereof in providing compartments and one of said shells having an arched roof in proximity to the arched top wall of the lower tank portion of said radiator, and heating devices in said compartments.

3. A radiator having the lower tank portion thereof provided with compartments, heating means in one of said compartments adapted to serve functionally as a light, electric heating devices in the other of said compartments, a bull's eye in the front side of said radiator and in front of said heating means, and slide doors at the rear side of said radiator whereby easy access can be had to the electric heating devices.

In testimony whereof I affix my signature in presence of two witnesses.

LOUIS WINTER.

Witnesses:
ANNA M. DORR,
KARL H. BUTLER.